Patented Feb. 28, 1933

1,899,810

UNITED STATES PATENT OFFICE

LUDWIG KERN, OF WEBSTER GROVES, MISSOURI

POROUS SILICEOUS CARBON AND THE MANUFACTURE THEREOF

No Drawing.   Application filed June 18, 1930.   Serial No. 462,129.

This invention relates to porous siliceous carbon, and with regard to certain more specific features, to porous siliceous carbon adapted for use as a substitute for bone-char.

Among the several objects of the invention may be noted the provision of a porous siliceous carbon product which is especially adaptable for use as a clarifying and decolorizing agent, which is manufactured from ordinary carboniferous silica such as occurs in coal beds and the like; a product which combines the clarifying action of kieselguhr and the like and the decolorizing action of bone-char or fuller's earth or the like; a process of manufacturing products of the class described which produces also as valuable by-products hydrocarbons and aluminum salts; and a process of the class described which is easily and efficiently carried through with the use of a minimum of expensive treating reagents. Other objects will be in part obvious and in part pointed out hereinafter.

The invention accordingly comprises the elements and combinations of elements, steps and sequence of steps and features of synthesis which will be exemplified in the description hereinafter and the scope of the application of which will be indicated in the following claims.

Carboniferous silica, which occurs primarily as hard rocks and gangue material in the beds of coal mines, comprises primarily silica and carbonaceous material with impurities such as aluminum, iron, magnesium, lime, and some hydrocarbons.

Carboniferous silica of the type described is heated or carbonized at a temperature up to about 250° C. to drive off mechanically contained water and part of the hydrocarbonaceous volatile constituents. The devolatilization process occasions the formation of some pores within the mass, but the principal part of the porosity is created as hereinafter provided.

The carbonized material is then preferably, although not necessarily, comminuted to powder or granular particle size, and treated with mineral acids, preferably sulphuric acid. The acid treatment is preferably accomplished by boiling. The acid reacts with the aluminum, iron, magnesium and like constituents of the material, converting them to sulphates which are subsequently leeched or washed out, while leaving the carbon and silica as a residue. It is this dissolving of earthy materials which occasions the majority of the porosity.

After the acid treatment, the solid material is preferably washed and dried, and further comminuted if desirable. The comminuted mass is then valuable as a substitute for bone-char, having the additional advantage of hardness of particle or granule not had in bone-char. Furthermore, the powder or granules are more easily purified after use as a bone-char substitute, as, for example, in clarifying sugar solutions in the refining of sugar, by merely washing, or by a brief carbonization at low-temperatures and subsequent washing.

The acid liquor contains quantities of dissolved aluminum and like salts which are recoverable by ordinary methods of precipitation or evaporation and crystallization.

The following is a specific example of the invention:

The carboniferous silica rock is first heated or carbonized at temperatures of from 150 to 250° C. until evolution of vapors ceases. The vapors may be collected and condensed in the manner customary in the art. The carbonized rock is then crushed to the fineness desired for commercial use. The crushed material is then charged into an acid-proof tank provided with heating means, and covered with mineral acids such as hydrochloric or sulphuric acids. The quantity of acid required depends upon the amount of constituents to be dissolved in the crushed rock. A slight surplus of acid over the required amount is desirable. For example, I use sufficient sulphuric acid of gravity 35° Bé. to cover the mass of comminuted material. The acid-comminuted material mixture is then boiled for about an hour, and then allowed to settle for about twenty hours. After settling is complete, the clear supernatant liquid, comprising primarily an acidic solution of aluminum sulphate, is withdrawn, by decanting or otherwise. This acidic solution may be reused with subsequent batches until the acid is entirely consumed, after which it is treated in a customary manner for the separation and recovery of the sulphate salts, especially aluminum sulphate, therein.

The solids remaining after the acid boiling are next leached or washed with hot or cold water until the excess of acid is removed and then dried at temperatures up to 100° C. The siliceous carbon so obtained is adapted for use as a substitute for bone-char in its various uses, as an acid-proof filter material, decolorizing agent, or the like.

In view of the foregoing, it will be seen that the several objects of the invention are achieved and other advantageous results attained.

As many changes could be made in carrying out the above objects without departing from the scope of the invention, it is intended that all matter contained in the above description shall be interpreted as illustrative and not in a limiting sense.

I claim:

1. The process of preparing a bone-char substitute which comprises heating carboniferous silica materials at a temperature sufficient to expel the volatile constituents thereof, comminuting said material, and heating the comminuted material with acid to dissolve therefrom metallic constituents, removing the excess of acid, and washing and drying the residue.

2. The process of preparing a bone-char substitute which comprises heating carboniferous silica materials at a temperature of the order of 250° C. whereby volatile constituents thereof are evolved, comminuting said material, and heating the comminuted material with hydrochloric acid to dissolve therefrom metallic constituents, removing the excess of acid, and washing and drying the residue.

3. The process of preparing a bone-char substitute which comprises heating carboniferous silica materials at a temperature of the order of 250° C., whereby volatile constituents thereof are evolved, comminuting said material, and heating the comminuted material with sulphuric acid to dissolve therefrom metallic constituents, removing the excess of acid, and washing and drying the residue.

In testimony whereof, I have signed my name to this specification this 13th day of June, 1930.

LUDWIG KERN.